May 28, 1940.  C. S. LAWTON  2,202,156
APPARATUS FOR LAYING SUBMARINE CABLES
Filed Feb. 23, 1938   3 Sheets-Sheet 3
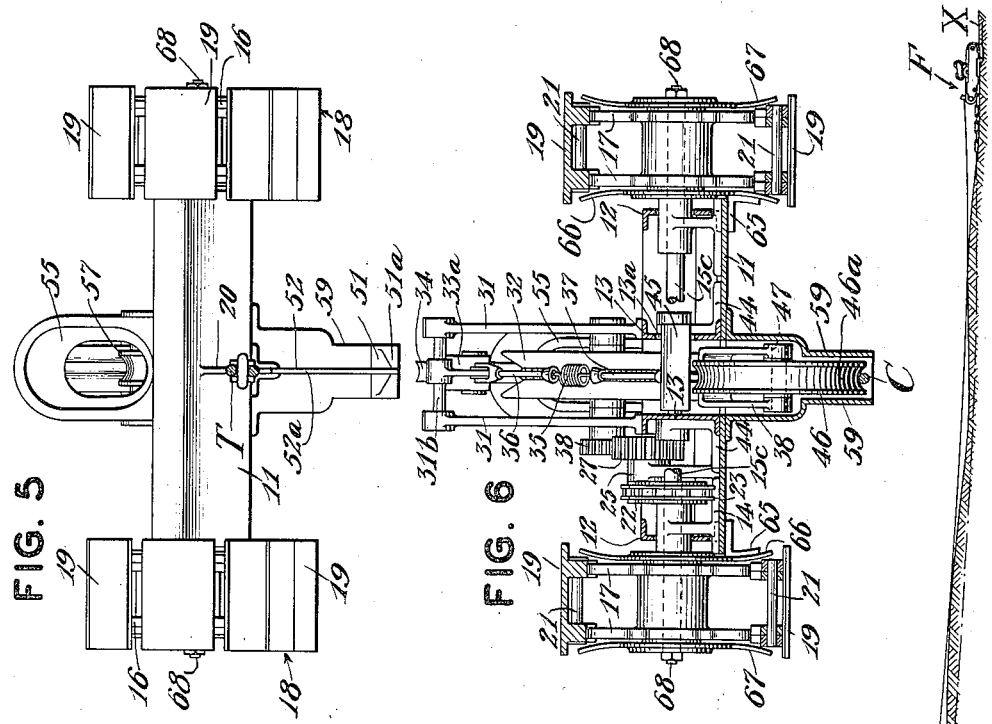
INVENTOR
C. S. LAWTON
BY
ATTORNEY Patented May 28, 1940

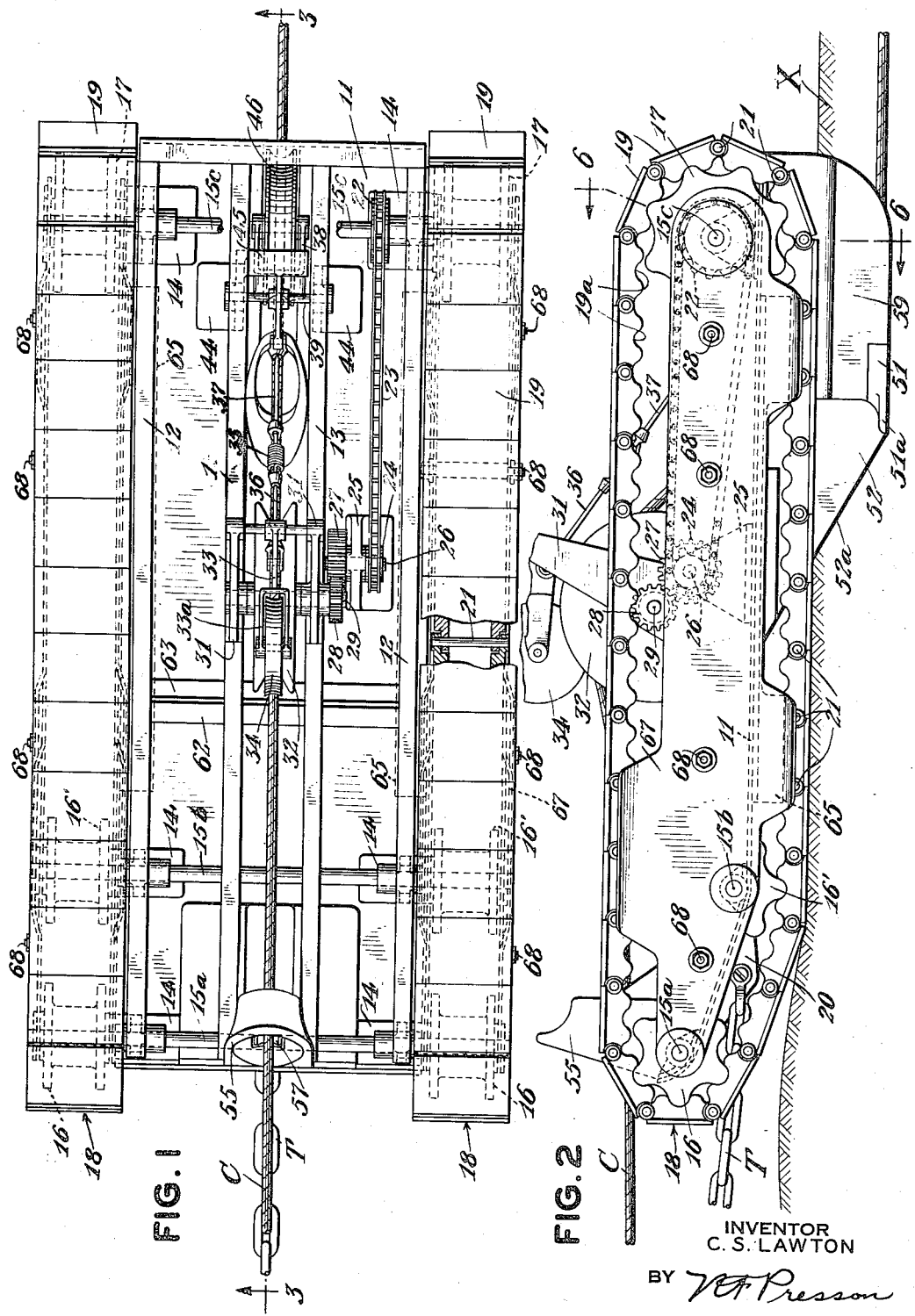

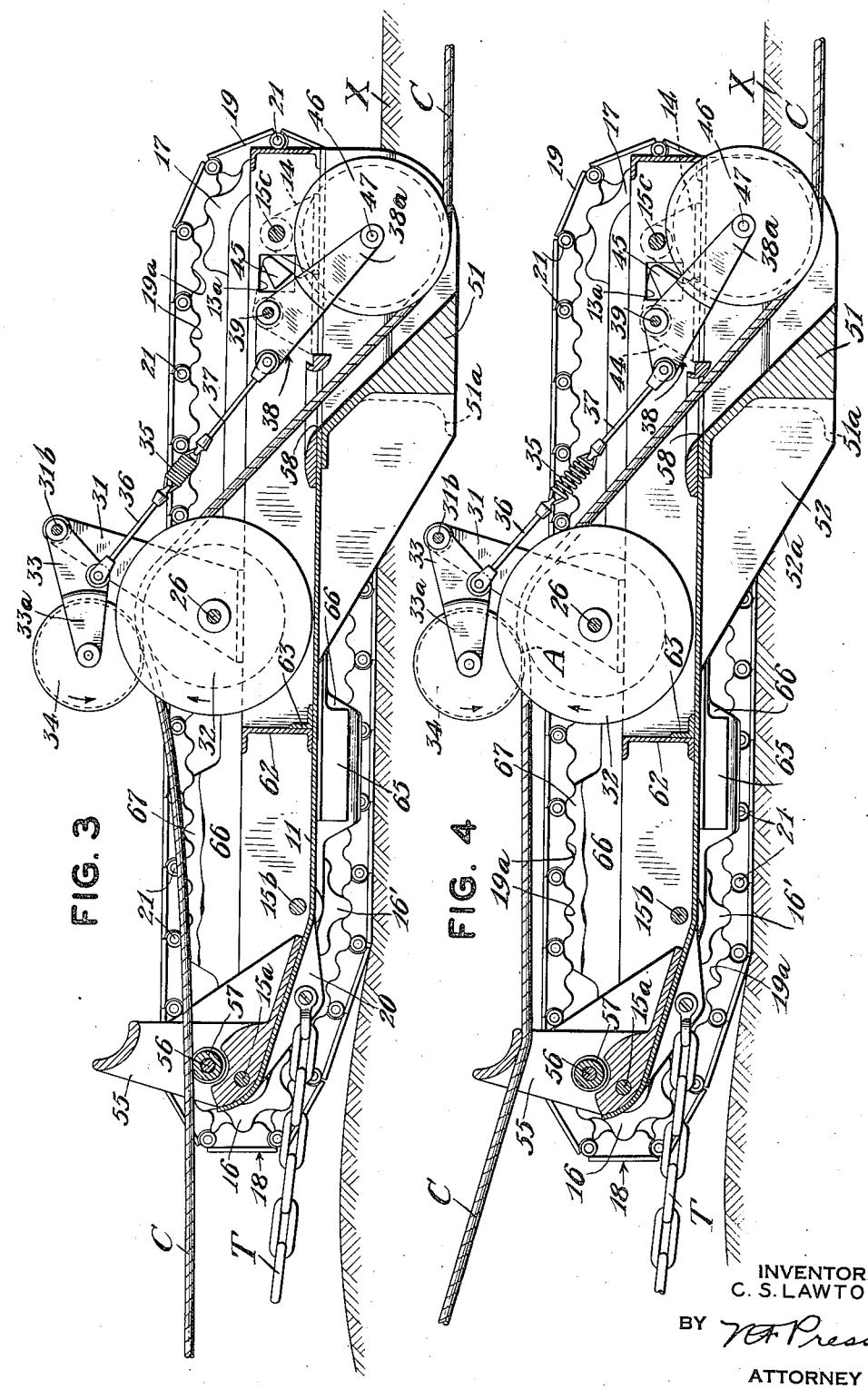

2,202,156

UNITED STATES PATENT OFFICE 2,202,156

APPARATUS FOR LAYING SUBMARINE CABLES

Chester S. Lawton, Ridgewood, N. J., assignor to The Western Union Telegraph Company, New York, N. Y., a corporation of New York Application February 23, 1938, Serial No. 192,114

7 Claims. (Cl. 61—72)

This invention relates to a novel method of, and apparatus for, laying a submarine cable in a trench in the bed of the ocean or other body of water.

When submarine cables are laid on the bottom of the ocean or other body of water which they traverse, they are frequently fouled or dragged and sometimes are broken by otter boards of nets of fishing vessels or by ships' anchors, and in the United States patent to Lawton and Bloomer, No. 2,067,717, issued January 12, 1937, and the patent to Lawton, No. 2,099,527, issued November 16, 1937, reissued March 1, 1938, Re. 20,665, there are disclosed submarine cable plows for forming under water a trench in the bed of the body of water in which the cable is to lie and simultaneously placing the cable therein to embed the same and thus avoid fouling of, or injury to, the cable.

In the use of such plows, there is considerable tension on the cable after it is laid in the trench, due to the tension on the length of cable between the plow and the cable ship from which the cable is payed out, particularly when the cable does not have the proper lead with respect to the plow, and also because of friction between the cable and the cable guide members on the plow as the cable passes through the plow. When the plow crosses a depression in the ocean bed and reaches higher ground, the tension on the cable behind the plow frequently causes the cable to be pulled out of the trench and lie on the bed or remain suspended above the bed at the depressed area. Similarly, when the plow crosses an elevation or obstruction in the bed, the tension on the cable may cause it to be pulled out of the trench in the lower area behind the plow. Also, when the course of the trench is changed, or when the plow deviates from its former course for any reason, there is a tendency for the cable to leave the trench. At those places where the cable leaves the trench, it is no longer embedded and hence is liable to become fouled or injured in the manner hereinbefore stated.

An object of the invention is to obviate the possibility of a submarine cable leaving its trench because of tension on the cable behind the plow or other embedding device.

Another object is to cause the cable to be laid in the trench in such manner that there is substantially no tension on the cable after it is in the trench.

Another object is a method of and means for preventing the tension on the cable ahead of an embedding device from being applied to the embedded cable behind the device.

A further object is to positively feed a submarine cable into a trench in the bed of the ocean or other body of water, and at the same rate as that of the forward travel of the embedding device.

The invention further resides in the features of combination, construction and arrangement hereinafter described and claimed.

For an understanding of the invention, and for illustration of one of the forms it may take, reference is had to the accompanying drawings, in which:

Fig. 1 is a top plan view of a cable laying and embedding device in accordance with the invention;

Fig. 2 is a side view, in elevation, of the device of Fig. 1;

Fig. 3 is a longitudinal section, taken along the line 3—3 of Fig. 1, showing certain parts in their normal operating positions;

Fig. 4 is a view similar to Fig. 3, showing the same parts in their operating positions when the tension on the cable ahead of the device has increased;

Fig. 5 is a view of the front end of the embedding device;

Fig. 6 is a cross-sectional view taken along the line 6—6 of Fig. 2, looking in the direction of the arrows; and Fig. 7 is a diagrammatic view of a cable ship and the cable embedding device in operation when laying a cable in a trench at the bottom of the ocean or other body of water.

Referring particularly to Figs. 1 to 6 of the drawings, there is shown a cable embedding device for forming a cable trench X, Figs. 2 to 4, and simultaneously feeding a cable C into the trench in a manner hereinafter set forth. The device has a frame or body portion of iron, steel or other suitable material, comprising a mounting plate 11 with channel iron members 12 and 13 secured thereto, as by welding or riveting. Mounted on the plate 11 are three pairs of brackets 14, Fig. 1, which brackets comprise bearings for rotatably mounting two forward shafts 15a and 15b and an after shaft 15c. Secured, as by keying, to the ends of these shafts are three pairs of sprocket wheels 16, 16' and 17 which support the frame or body portion, the sprocket wheels carrying, and also being driven by, two endless bands or caterpillar tracks 18 which travel on the bed of the body of water and are caused to revolve in a counter-clockwise direction as seen in Figs. 2 to 4, by the forward movement of the embedding device, as it is towed by the cable ship, Fig. 7, due to the traction between the tracks and the bed. The tracks slope upwardly from the bed at the forward end of the embedding device, as shown in Figs. 2 to 4, to facilitate the travel of the device over obstacles and irregular surfaces. Secured to the forward end of the device is a lug 20 to which the towline T, which is preferably a chain, is attached.

Any suitable type of track 18 or other tractive device may be employed; in the illustrative form shown, each of the tracks is composed of track shoes 19 pivotally connected by pins 21, the outer sides of the shoes being in the form of plates and forming an articulated track, and the inner sides of the shoes having grooved portions 19a for receiving the teeth of the sprocket wheels 16, 16' and 17. It will be understood that the shoes 19 may have any of the various known forms and may have cleats, grousers or other devices to obtain the desired traction between the tracks and the ocean bed, if necessary.

Secured to the after shaft 15c in any suitable manner, as by keying, is a sprocket 22 which is driven by the shaft, the latter being driven by the sprockets 17 which are caused to rotate by the revolution of the tracks 18 as the embedding device travels along on the bed. The sprocket 22 is connected by a driving chain 23 to a driven sprocket or pinion 24 keyed to a stub shaft 26 which is rotatably mounted in a bracket 25 secured to the plate 11. The shaft 26 has keyed thereto a gear 27 which meshes with a gear 28 secured to a shaft 29 rotatably mounted in brackets 31 secured to channel members 13. Keyed to the shaft 29, and rotatable therewith, is a sheave or feed roller 32 around which the cable C is deflected as it is passed through the embedding device. By means of the driving train above described, the movement of the tracks 18 as the embedding device travels along causes the feed roller 32 to rotate, in a clockwise direction as viewed in Figs. 2 to 4, the gear ratios of the elements of the driving train being such as to rotate the feed roller at the proper speed to cause the cable to be fed into the trench X at a rate relative to the forward movement of the embedding device such that no tension is exerted on the cable behind the device, the cable being laid in the trench at the same rate as that of the forward travel of the device.

Coacting with the feed roller 32 is jockey roller 34 rotatably mounted in the bifurcated portion 33a of an arm 33 which is pivotally mounted on a shaft 31b carried by the brackets 31. Under certain conditions hereinafter referred to, spring tension is exerted on the jockey roller by means of a contractile spring 35 secured at its ends to ropes or rods 36 and 37, Figs. 3 and 4, the member 36 being pivotally connected to the arm 33, and the member 37 being pivotally connected to an arm 38. The arm 38 is pivotally mounted on a shaft 39, the shaft being carried by brackets 44 secured to the plate 11. Arm 38 has a bifurcated portion 38a which carries an after sheave or cable roller 46 rotatably mounted on a shaft 47 carried by the bifurcated portion 38a. A stop arm 45, integral with one of the brackets 44, limits the upward movement of the arm 38 and roller 46, the arm 45 passing through an opening 13a in one of the channel members 13, as shown in Fig. 6.

Rigidly secured to the plate member 11 in any suitable manner, as by welding or riveting, and depending therefrom, is a trench-forming device, for example, a plowshare 51 of wrought or cast steel or other suitable material, for plowing the cable trench in the bed of the body of water. Preferably, and as shown, the plowshare has wing members 51a on either side thereof to facilitate displacing the material forming the bed sufficiently to enable the cable to be deposited in the bottom of the resulting trench. In order to prevent fouling of the plowshare by obstructions, such as underlying rock formations and the like which may be encountered in the ocean bed, a web portion 52 is provided which extends between the plowshare and the plate 11, the inclined forward portion 52a of which web engages any such obstruction in advance of the plowshare and causes the latter to be lifted up over the obstruction. After the obstruction has been passed, the device immediately begins again to plow the cable trench and continues with the embedding operation of the cable, and thus operations need not be suspended because of any obstruction encountered.

Secured to the plate 11 is a cable guide member 55, preferably having the form of a bell mouth, to permit the cable C easily to enter the guide and to reduce friction as the cable passes therethrough and to minimize possibility of injury to the cable. Within the bell mouth, and mounted on a shaft 56, is a sheave or cable guide roller 57. After passing over the roller 57 the cable passes between the feed roller 32 and jockey roller 34, and thence through a trunkway 58 so that a free passage is afforded the cable into the trench formed by the plow 51, the cable being forcibly laid in the bottom of the trench by means of the after cable guide roller 46 which has a grooved portion 46a that receives and guides the cable into the center and lowermost part of the trench X. The cable is thus caused to be positively fed into the trench immediately behind the plow, the cable passing between two side plates 59, Fig. 6, in order that the material displaced by the plow will not slide or be washed back into the trench before the cable is laid therein. After the cable is laid the trench generally will fill rapidly due to silt deposits and the washing effect of the water, so that the cable becomes covered with the displaced material without the necessity of back filling and in time is firmly embedded in the bed of the body of water.

Transversely extending channel and angle iron pieces 62 and 63, welded or riveted to the plate 11, are provided to brace the frame in this direction. Also secured to the plate 11 are two angle pieces 65, Fig. 6, which carry inner track guide members 66. Outer track guide members 67 are carried by studs 68, Figs. 1 and 2, secured to the inner members 66, these guide members preventing the tracks 18 from coming off the sprocket wheels 16, 16' and 17.

When laying a submarine cable, as will be seen from Fig. 7, the cable embedding device F is towed by a cable ship or vessel V, by means of the towline T, and the cable is payed out from the ship, both the towline and cable forming long curves in the water. By employing a towline of proper length, which may be determined empirically or by calculation, the sag in the line will cause the line to exert a pull on the cable embedding device in a direction substantially parallel to the bed on which the device is traveling, and thus keep the plow 51 at the proper depth in the bed. Preferably, the lead of the cable with respect to the embedding device is maintained such that the cable is approximately tangent to the bed at or near the point where it enters the device F, the ideal condition being that the cable enters the device at the point where it would naturally be tangent to the bed.

The cable is payed out from a cable supply in the hold of the vessel, the amount of cable in the water between the vessel and embedding device and the stress on the cable being controllable within certain limits by suitable dynamometer and brake devices on board the vessel, in the manner set forth in the aforesaid Lawton and Bloomer Patent No. 2,067,717. The stress on the towline may also be measured and controlled within certain limits on board the vessel, thereby enabling the length of towline between the vessel and cable embedding device to be adjusted to varying depths of water and conditions of towing, as disclosed in the aforesaid patent.

Referring again to Fig. 3, the cable feeding rollers 32 and 34 and the after guide roller 46 are shown in their normal operating positions, i. e., when the cable has a proper lead with respect to the embedding device, at which time the spring 35 is not extended and there is substantially no tension on the jockey roller 34, and practically the only pressure exerted by the jockey roller on the cable is the weight of the roller, and the cable is not deflected by the roller. At this time it will be noted that the after cable guide roller 46 is in its lowermost position in the cable trench. Under these conditions a slight slippage will occur between the cable and the feed roller 32, which, as shown on Figs. 1 and 2 of the drawings, is geared up through the medium of pinions and gears 24, 27 and 28, and thus has a peripheral speed somewhat in excess of the speed at which the device travels over the ocean bed.

When the tension of the cable ahead of the plow increases, as when the cable does not have the proper lead, the condition shown in Fig. 4 obtains. At such time there is a tendency for the tension on the cable ahead of the plow to be applied to the cable laid in the trench behind the plow and cause the cable to leave the trench at the times hereinbefore referred to. This is prevented in the structure disclosed since, at the instant any substantial tension is applied to the cable in the trunkway 58 the cable rises slightly where it passes around the after sheave 46 and raises the sheave a corresponding extent. This slight rise of the sheave causes the arm 38 to rotate a slight distance, in a counter-clockwise direction as viewed in Figs. 3 and 4, and the rotation of the arm extends the spring 35 which causes the jockey roller 34 to exert sufficient pressure on the cable to deflect the same at the point A as shown in Fig. 4, and snub the cable. Submarine cable is armored and is relatively stiff, and the pressure exerted by the jockey sheave on the cable and the deflection of the cable in the manner shown prevents the tension or stress on the cable ahead of the rollers 32 and 34 from passing through the rollers and substantially affecting, or being applied to, the cable as it passes into the trench or after it is laid in the trench. If the spring 35 were omitted, and the arm 38 connected solely by a rod or cable to the arm 33, it is conceivable that pressures would be developed at the jockey roller sufficient to crush or permanently kink the cable. As soon as the tension on the cable ahead of the plow slackens off, the sheave 46 again descends to its normal operating position, and the spring contracts until its coils are closed, which removes the tension formerly applied to the jockey roller, and thus the normal condition shown in Fig. 3 again obtains. Whenever, due to any combination of circumstances, the cable behind the plow begins to feel the effects of increasing tension, which reacts against the roller 46 so as to move jockey roller 34 into position for exerting sufficient pressure on the cable to prevent slippage on roller 32. Due to the somewhat excess peripheral speed of the roller over the speed at which the device advances over the ocean bed, the tension on the cable behind the plow is thus automatically relieved before it can become excessive.

Regardless of the degree of tension or stress on the cable ahead of the embedding device, the cable is positively fed or pushed into the trench in such manner that there is substantially no tension on the cable behind the device tending to cause the cable to leave the trench after it is placed therein, the cable lying in the trench in a static condition.

In the illustrative embodiment shown, caterpillar tracks are employed to obtain the necessary traction or adhesive friction of the device on the surface of the bed for operating the cable feeding rollers at the proper rate relative to the forward motion of the embedding device, but it is to be understood that any other suitable tractive device mounted on or associated with the embedding device may be employed for operating the feed rollers. Also, the invention may advantageously be employed with various forms of cable laying devices, irrespective of whether the cable is laid in a trench, to minimize or obviate tension on the cable after it passes through the devices and is laid on or embedded in the bed of the body of water.

The cable laying device may be lowered onto the bed of the ocean or other body of water by any suitable form of lowering line, and the device may be provided with any suitable form of lowering attachment, such as those shown in the aforesaid Patents Nos. 2,067,717 and Re. 20,665. Because of the disposition of the center of gravity which is kept low in the device, and because of the substantial breadth of the device, it will not turn over even though canted through a large angle with respect to the horizontal. The device is especially adapted for embedding submarine cables in deep water and at considerable distances from shore, and may be lowered into working position out at sea in such areas.

While there is shown and described herein a preferred embodiment of the invention, many other and varied forms and uses will suggest themselves to those versed in the art without departing from the invention, and the invention is, therefore, not limited except as indicated by the scope of the appended claims.

I claim:

1. A submarine cable laying device and means for causing the device to travel along under water on the bed of the body of water on which the cable is to lie, means for paying out the cable to the device as it travels along, said device having rotatable means for positively feeding the cable through the device as it travels along and at a rate substantially equal to the forward movement of the device, means on said device movable by the cable to different operative positions in accordance with the degree of tension on the cable as it passes through the device, and means controlled by said last named means and coacting with said rotatable feeding means to grip the cable and prevent excessive tension on the cable ahead of the device from being applied to the cable laid behind the device.

2. A submarine cable laying device and means for causing the device to travel along under water on the bed of the body of water on which the cable is to lie, means for paying out the cable to the device as it travels along, said device having rotatable means for positively feeding the cable through the device as it travels along and at a rate substantially equal to the forward movement of the device, means on said device movable by the cable to different operative positions in accordance with the degree of tension on the cable as it passes through the device, and means controlled by said last named means for gripping the cable to change the rate of feed of the cable and prevent excessive tension on the cable ahead of the device from being applied to the cable laid behind the device.

3. Apparatus for laying a submarine cable, comprising a device having means for forming a trench in the bed of the body of water in which the cable is to lie, means for towing said device along the bed, said device having cable guide structure for directing the cable through the device and into the trench, means on said device engaging the bed and movable relative to the device by the traction between said means and the bed as the device travels along, rotatable means driven by said last named means for feeding the cable through the device at a rate substantially corresponding to the forward movement of the device as it travels along the bed, a device movable by the cable to different positions corresponding to the degree of tension on the cable as it passes into the trench, and means controlled by said last named device and coacting with said rotatable feeding means to grip the cable and change the rate of feed of the cable through the device to prevent excessive tension on the cable ahead of the device from being applied to the cable laid in the trench behind the device.

4. A submarine cable laying device and means for causing the device to travel along under water on the bed of the body of water in which the cable is to lie, means for paying out the cable to the device as it travels along, said device having an element engaging said bed and movable relative to the device by the tractive effect between said element and the bed, said device having means driven by said movable element for feeding the cable through the device as it travels along.

5. A submarine cable laying device comprising a supporting endless track structure for engaging and traveling along on the bed of the body of water in which the cable is to lie, means for causing the device to travel along on said bed, means for paying out the cable to the device as it travels along, said track structure being caused to rotate relative to the device by the tractive effect between said structure and the bed, said device having means driven by said track structure for feeding the cable through the device as it travels along.

6. Apparatus for laying a submarine cable, comprising a trench-forming device supported on an endless traveling track structure for engaging and traveling along on the bed of the ocean or other body of water in which the cable is to lie, means for towing said device along on the bed to form a trench, said track structure rotating relative to the device by the tractional effect between the structure and the bed during the forward movement of the device, means on said device for feeding the cable through the device and into the trench, said feeding means being operated by the rotational movement of the track structure as the device travels along and causing the cable to be fed into the trench at a rate corresponding to the forward movement of the trench-forming device.

7. Apparatus for laying a submarine cable in the bed of the ocean or other body of water in which the cable is to lie, comprising a trench-forming device supported on an endless traveling track structure for engaging and traveling along on said bed, means for towing said device along on the bed to form a trench, said track structure rotating relative to the device by the tractional effect between the structure and the bed, means for paying out the cable to the device, means for simultaneously passing the cable through the device as it travels along, said last named means including a rotatable cable feeding device and a cable guide device for feeding and guiding the cable into the trench behind the device, means for causing the rotating track structure to rotate the cable feeding device to feed the cable into the trench at a rate corresponding to the forward movement of the trench-forming device, said cable guide device being movable to different operative positions in accordance with the degree of tension on the cable ahead of the trench-forming device, and means operatively connecting said cable guide device with the cable feeding device to cause the feeding device to snub the cable to prevent an increase in tension on the cable ahead of the device from being applied to the cable in the trench.

CHESTER S. LAWTON.